(12) United States Patent
Rahn

(10) Patent No.: US 9,136,972 B2
(45) Date of Patent: Sep. 15, 2015

(54) CONTROLLING AN OPTICAL TRANSMITTER THAT SUPPORTS MULTIPLE MODULATION FORMATS AND BAUD RATES

(71) Applicant: Infinera Corp., Sunnyvale, CA (US)

(72) Inventor: Jeffrey T. Rahn, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/141,813

(22) Filed: Dec. 27, 2013

(65) Prior Publication Data

US 2015/0188658 A1 Jul. 2, 2015

(51) Int. Cl.
*H04B 10/00* (2013.01)
*H04J 14/02* (2006.01)

(52) U.S. Cl.
CPC .................................. *H04J 14/0263* (2013.01)

(58) Field of Classification Search
CPC ........... H04B 10/5055; H04B 10/5057; H04B 10/504; H04B 10/505; H04B 10/152; H04B 10/564; H04B 10/58; H04B 10/50; H04B 10/572; H04B 10/506; H04J 14/02; G01R 33/28; G01R 33/283; H01S 5/06832; H01S 5/0683; H01S 5/0687
USPC ......... 398/162, 192, 195–198, 137, 158, 212, 398/213
See application file for complete search history.

(56) References Cited

U.S. PATENT DOCUMENTS

| | | | |
|---|---|---|---|
| 6,188,732 B1 * | 2/2001 | Rha ................................ | 375/297 |
| 6,563,622 B2 * | 5/2003 | Mueller et al. ................ | 398/182 |
| 6,665,321 B1 * | 12/2003 | Sochava et al. ................. | 372/20 |
| 6,826,205 B1 * | 11/2004 | Myers et al. .................... | 372/18 |
| 6,911,645 B2 * | 6/2005 | Beger et al. .............. | 250/227.19 |
| 7,145,923 B2 * | 12/2006 | Carter et al. .................... | 372/20 |
| 7,460,567 B2 * | 12/2008 | May ............................... | 372/18 |
| 7,596,323 B1 * | 9/2009 | Price et al. .................... | 398/141 |
| 7,620,081 B2 * | 11/2009 | Shahine ................... | 372/29.011 |
| 7,680,364 B2 * | 3/2010 | Nilsson et al. .................. | 385/14 |
| 7,986,878 B2 * | 7/2011 | Saunders et al. ................ | 398/26 |
| 8,126,332 B2 * | 2/2012 | Bainbridge et al. ............ | 398/95 |
| 8,594,514 B2 * | 11/2013 | Rahn ............................ | 398/195 |
| 2009/0196602 A1 * | 8/2009 | Saunders et al. ................ | 398/26 |
| 2010/0272446 A1 * | 10/2010 | Harley et al. .................. | 398/184 |
| 2011/0229150 A1 * | 9/2011 | Nishihara et al. ............. | 398/195 |
| 2011/0293276 A1 * | 12/2011 | Takahara ........................ | 398/65 |
| 2012/0301153 A1 * | 11/2012 | Takeguchi et al. ............ | 398/135 |

OTHER PUBLICATIONS

Co-pending U.S. Appl. No. 14/141,819, entitled "Controlling an Optical Transmitter That Supports Multiple Modulatin Formats and Baud Rates" by Rahn, filed Dec. 27, 2013, 59 pages.

* cited by examiner

*Primary Examiner* — Hibret Woldekidan
(74) *Attorney, Agent, or Firm* — Harrity & Harrity LLP; David L. Soltz

(57) ABSTRACT

An optical device receives a modulation format and a baud rate for transmission of an optical signal with multiple subcarrier signals, and generates the optical signal based on the modulation format and the baud rate. The optical device generates a dual-etalon response based on the optical signal, the modulation format, and the baud rate, where the dual-etalon response includes multiple peaks. The optical device compares the subcarrier signals of the optical signal and the peaks of the dual-etalon response, and determines, based on the comparing, whether at least one of the subcarrier signals aligns with a peak of the dual-etalon response. The optical device locks or adjusts a wavelength of the optical signal for the modulation format and the baud rate based on whether at least one of the subcarrier signals aligns with a peak of the dual-etalon response.

20 Claims, 11 Drawing Sheets

CONTROLLING AN OPTICAL TRANSMITTER THAT SUPPORTS MULTIPLE MODULATION FORMATS AND BAUD RATES

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component that includes a laser associated with each wavelength, a modulator configured to modulate the output of the laser, and a multiplexer to combine each of the modulated outputs (e.g., to form a combined output or WDM signal). Dual-polarization (DP) (also known as polarization multiplex (PM)) is sometimes used in coherent optical modems. A Tx PIC may include a polarization beam combiner (PBC) to combine two optical signals into a composite DP signal.

A WDM system may also include a receiver circuit having a receiver (Rx) PIC. The Rx PIC may include a polarization beam splitter (PBS) to receive an optical signal (e.g., a WDM signal), split the received optical signal, and provide two optical signals (e.g., associated with orthogonal polarizations) associated with the received optical signal. The Rx PIC may also include an optical demultiplexer circuit (referred to as a "demultiplexer") configured to receive the optical signals provided by the PBS and demultiplex each one of the optical signals into individual optical signals. Additionally, the receiver circuit may include receiver components to convert the individual optical signals into electrical signals, and output the data carried by those electrical signals.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

In a WDM system, the Tx PIC may modulate a phase of a signal in order to convey data (via the signal) to the Rx PIC where the signal may be demodulated such that data, included in the signal, may be recovered. A particular modulation format (e.g., quadrature phase-shift keying (QPSK), quadrature amplitude modulation (QAM), or the like) may be used to modulate the input signal. Different modulation formats correspond to different distances that the input signal may be transmitted. Further, different modulation formats may result in different bit error rates (BERs) associated with the signal. Typical TX PICs support a single modulation format and a single baud rate.

SUMMARY

In some implementations, an optical system may include a transmitter configured to receive information associated with a modulation format and a baud rate for transmission of an optical signal that includes one or more subcarrier signals, and generate the optical signal based on the modulation format and the baud rate. The optical system may include a detector configured to receive the information associated with the modulation format and the baud rate, receive the optical signal, and generate a dual-etalon response based on the optical signal, the modulation format, and the baud rate. The dual-etalon response may include multiple peaks. The optical system may include a controller configured to compare the one or more subcarrier signals of the optical signal and the multiple peaks of the dual-etalon response, and determine, based on the comparing, whether at least one of the one or more subcarrier signals aligns with a peak of the multiple peaks of the dual-etalon response. The controller may be configured to selectively lock a wavelength of the optical signal for the modulation format and the baud rate based on whether at least one of the one or more subcarrier signals aligns with a peak of the multiple peaks of the dual-etalon response.

In some implementations, an optical system may include an optical transmitter, and a controller configured to receive a modulation format and a baud rate for transmission of an optical signal by the optical transmitter, and instruct the optical transmitter to generate the optical signal based on the modulation format and the baud rate. The optical signal may include one or more subcarrier signals. The controller may be configured to instruct the optical system to generate a dual-etalon response based on the optical signal, the modulation format, and the baud rate. The dual-etalon response may include multiple peaks. The controller may be configured to determine whether at least one of the one or more subcarrier signals aligns with a peak of the multiple peaks of the dual-etalon response, and instruct the optical transmitter to lock or adjust a wavelength of the optical signal for the modulation format and the baud rate based on whether at least one of the one or more subcarrier signals aligns with a peak of the multiple peaks of the dual-etalon response.

In some implementations, a method may include receiving, by a device, a modulation format and a baud rate for transmission of an optical signal by the device, and generating, by the device, the optical signal based on the modulation format and the baud rate. The optical signal may include one or more subcarrier signals. The method may include generating, by the device, a dual-etalon response based on the optical signal, the modulation format, and the baud rate. The dual-etalon response may include multiple peaks. The method may include comparing, by the device, the one or more subcarrier signals of the optical signal and the multiple peaks of the dual-etalon response, an determining, by the device and based on the comparing, whether at least one of the one or more subcarrier signals aligns with a peak of the multiple peaks of the dual-etalon response. The method may include locking or adjusting, by the device, a wavelength of the optical signal for the modulation format and the baud rate based on whether at least one of the one or more subcarrier signals aligns with a peak of the multiple peaks of the dual-etalon response.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Figure 1:
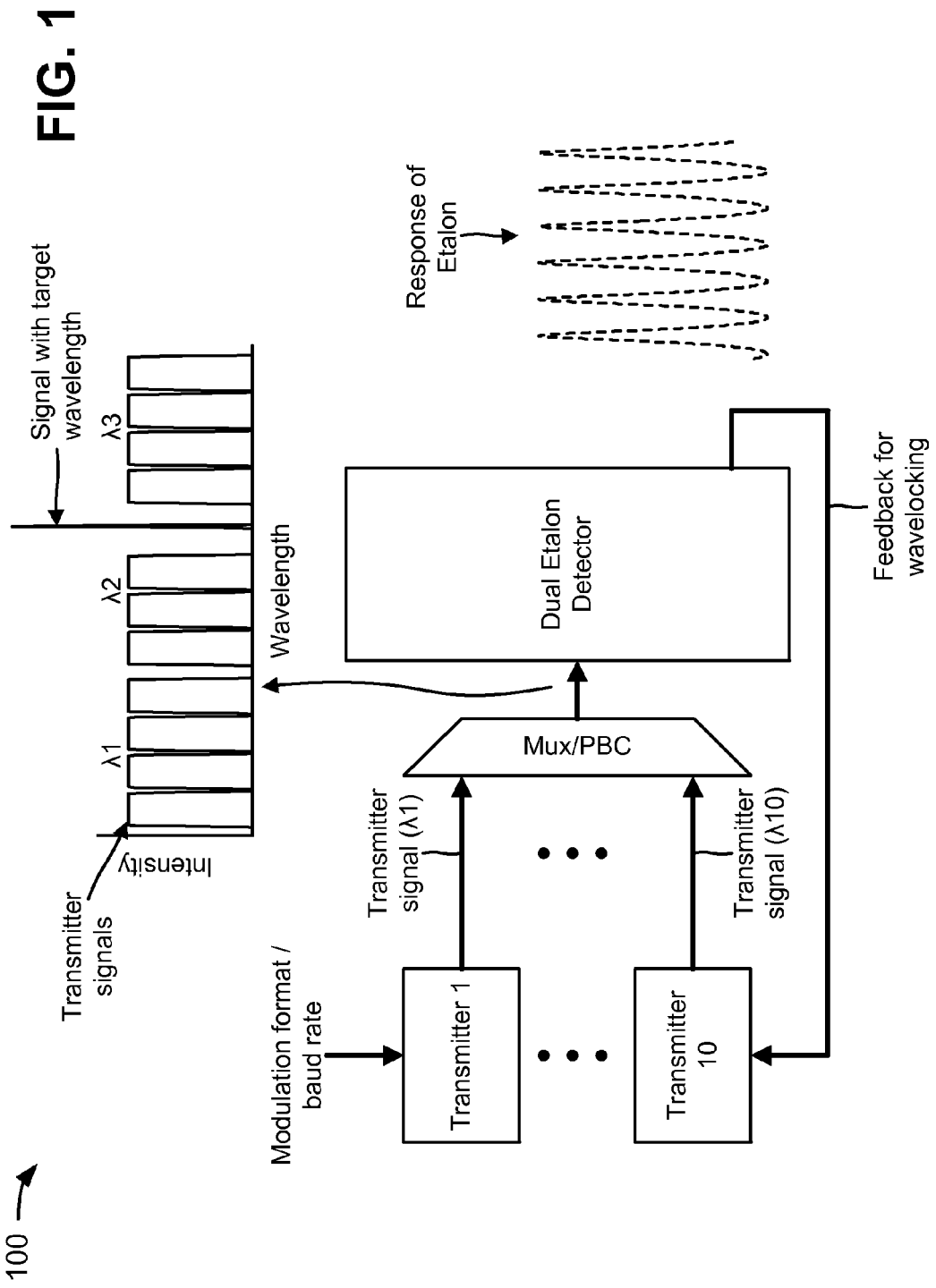
FIG. 1 is a diagram of an overview of an example implementation described herein.

FIG. 1 is a diagram of an overview of an example implementation 100 described herein. As shown in FIG. 1, multiple transmitters may transmit multiple optical signals, of different wavelengths, that are combined onto a single optical fiber. Each transmitter may transmit an optical transmitter signal at a particular wavelength that is different than wavelengths transmitted by the other transmitters. For example, a first transmitter may transmit a first transmitter signal at a first wavelength ($\lambda 1$), a second transmitter may transmit a second transmitter signal at a second wavelength ($\lambda 2$) that is different than the first wavelength, etc.

In some implementations, the transmitters may support communications over a number of wavelength channels. For example, the transmitters of FIG. 1 may support ten channels over a particular wavelength range (e.g., a two-hundred gigahertz (GHz) range). In some implementations, each transmitter may provide multiple subcarrier signals, which are independent signals transmitted by the same transmitter. In some implementations, the transmitters may enable a user of the transmitters to select a particular modulation format (e.g., QPSK, 8-QAM, 16-QAM, etc.) and a particular baud rate (e.g., in gigabaud (GBd)) for the transmitter signals. The transmitters may change the channel spacing of the transmitter signals based on the particular modulation format and baud rate selected by the user.

As further shown in FIG. 1, in order to change the channel spacing of the transmitter signals, a dual-etalon detector may be provided with the transmitters. The dual-etalon detector may generate stable reference signals that include different frequency grids for different modulation formats and baud rates. As shown in FIG. 1, a selected modulation format and baud rate may be provided to the transmitters and the dual-etalon detector. The transmitters may generate ten transmitter signals at different wavelengths based on the modulation format and the baud rate. The dual-etalon detector may include a response that is wavelength dependent. The dual-etalon detector may generate a dual-etalon signal based on the wavelengths present in the transmitter signals, as shown in FIG. 1. As further shown in FIG. 1, each of the ten transmitters may generate four subcarrier signals (e.g., four square peaks) at a particular wavelength. The dual-etalon response may include a response with peaks and troughs.

In some implementations, the dual-etalon signal may be utilized to control and/or lock the wavelengths of the transmitter signals (e.g., referred to herein as wavelocking). For example, the subcarrier signals of each transmitter signal may be compared to the peaks of the dual-etalon response in order to provide wavelength control at different modulation formats and/or baud rates. If at least one subcarrier of a particular transmitter signal aligns with a peak of the dual-etalon response, the wavelength of the particular transmitter signal may be determined to be correct. Based on this determination, the wavelength of the particular transmitter signal may be locked or set. If at least one subcarrier of a particular transmitter signal does not align with a peak of the dual-etalon response, the wavelength of the particular transmitter signal may be determined to be incorrect. Based on this determination, the wavelength of the particular transmitter signal may be adjusted until at least one subcarrier aligns with a peak of the dual-etalon response. As shown in FIG. 1, such determinations may be provided, as feedback for wavelocking, to the transmitters. As shown in FIG. 1, all of the transmitter signals include at least one subcarrier that aligns with a peak of the dual-etalon response. Thus, the wavelengths of the transmitter signals, provided by the transmitters, may be locked.

Systems and/or methods described herein may provide control of an optical transmitter that can be dynamically configured to different modulation formats and/or baud rates. The systems and/or methods may enable wavelength channel spacing to be altered based on a selected modulation format and/or baud rate. The systems and/or methods may also enable the optical transmitter to provide multiple subcarrier signals for each transmitter of the optical transmitter. The systems and/or methods may enable wavelengths of transmitters to be accurately determined and locked, which may enable the channel spacing of the transmitter signals to be accurately aligned.

Figure 2:
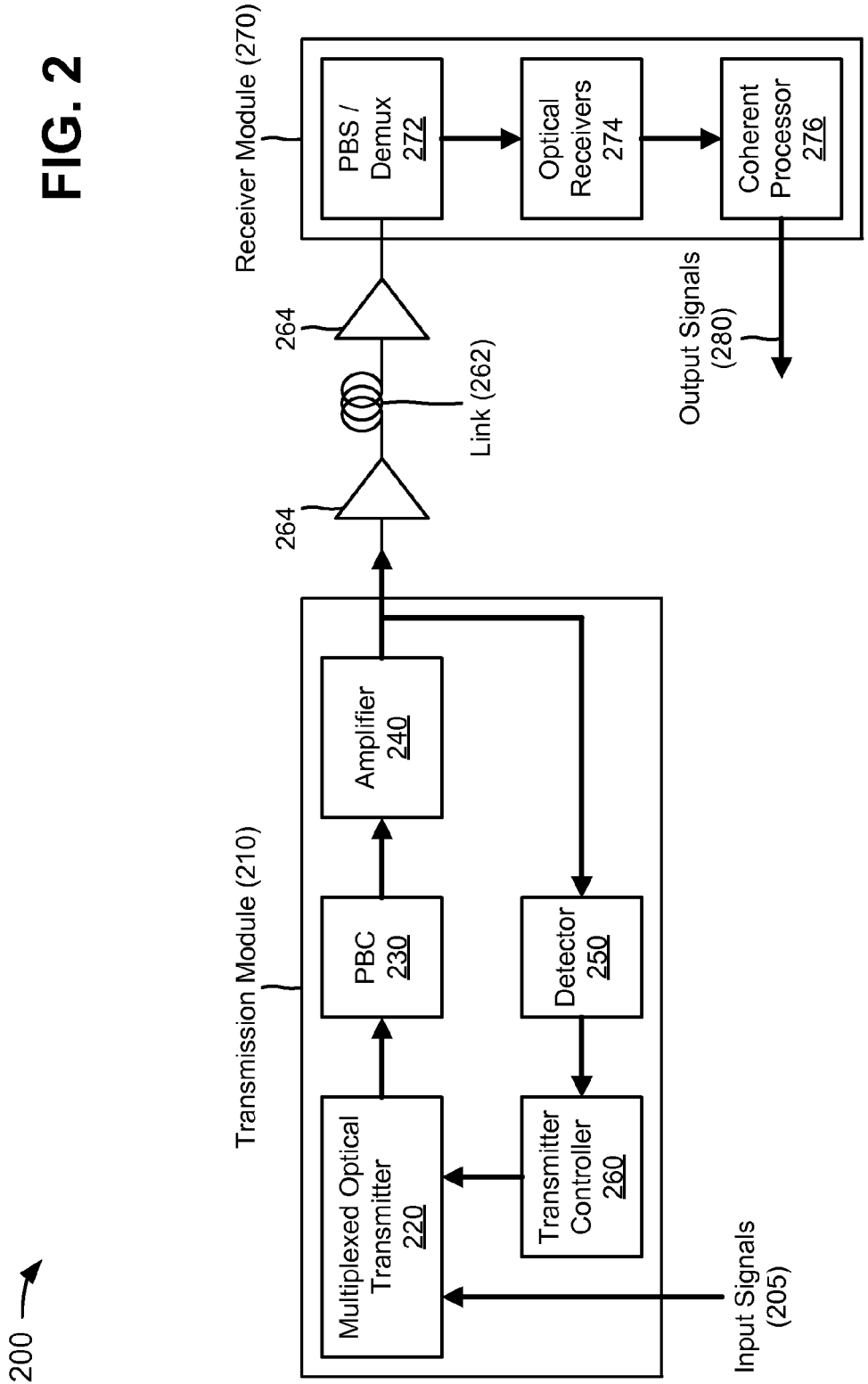
FIG. 2 is a diagram of an example environment in which systems and/or methods described herein may be implemented.

FIG. 2 is a diagram of an example environment 200 in which systems and/or methods described herein may be implemented. As illustrated, environment 200 may include a transmitter (Tx) module 210 and a receiver (Rx) module 270. In some implementations, transmitter module 210 may be optically connected to receiver module 270 via link 262, and/or optical amplifiers 264. Link 262 may include one or more optical amplifiers 264 that amplify an optical signal as the optical signal is transmitted over link 262.

Transmitter module 210 may include one or more devices that generate, process, and/or transmit an optical signal to be received by receiver module 270. In some implementations, transmitter module 210 may enable a user of transmitter module 210 to set a modulation format and/or baud rate for the optical signal based on a distance provided between transmitter module 210 and receiver module 270 and/or a desired spectral efficiency. For example, if the distance between transmitter module 210 and receiver module 270 is less than or equal to five-hundred (500) kilometers (km), the user may select a 16-QAM modulation format (e.g., a spectrally efficient format) and a 16.5 GBd baud rate since such a modulation format and baud rate may transmit optical signals up to 500 km. In another example, if the distance between transmitter module 210 and receiver module 270 is greater than 500 km and less than or equal to one-thousand five-hundred (1,500) km, the user may select an 8-QAM modulation format (e.g., a less spectrally efficient format) and a 22 GBd baud rate since such a modulation format and baud rate may transmit optical signals up to 1,500 km. In still another example, if the distance between transmitter module 210 and receiver module 270 is greater than 1,500 km, the user may select a QPSK modulation format (e.g., an even less spectrally efficient format) and a 33 GBd baud rate.

As shown in FIG. 2, transmitter module 210 may include an optical transmitter 220, a polarization beam combiner (PBC) 230, an amplifier 240, a detector 250, and a transmitter controller 260.

Optical transmitter 220 may include one or more devices that generate, process, and/or transmit optical signals. In some implementations, optical transmitter 220 may generate optical signals for transmission to PBC 230. In some implementations, optical transmitter 220 may modulate the optical signals (e.g., according to a modulation format) based on control signals provided by transmitter controller 260. The control signals may include a signal instructing optical transmitter 220 to lock one or more wavelengths of the optical signals and/or a signal instructing optical transmitter 220 to adjust one or more wavelengths of the optical signals. In some implementations, optical transmitter 220 may multiplex the modulated optical signals (e.g., using wavelength-division multiplexing (WDM) techniques).

PBC 230 may include one or more devices that receive optical signals from optical transmitter 220 and combine the received optical signals into an optical signal for output. In some implementations, PBC 230 may receive optical signals from optical transmitter 220, and may combine one or more of the optical signals into an optical signal with a dual polarization. PBC 230 may output, to amplifier 240, the optical signal with the dual polarization. In some implementations, PBC 230 may be omitted if a modulation format of optical transmitter 220 is not polarization multiplexed.

Amplifier 240 may include a device that increases an amplitude and/or power level of a received optical signal, while maintaining characteristics of the optical signal (e.g., a wavelength, a bandwidth, a polarization, a phase, etc.). Amplifier 240 may receive the optical signal from PBC 230, and may amplify the optical signal to an amplitude that is greater than a particular threshold. Amplifier 240 may output the amplified optical signal to detector 250 and/or receiver module 270.

Detector 250 may include one or more devices that detect an optical signal and output an electrical signal based on the detected optical signal. Detector 250 may, for example, output an electrical signal based on all or a portion of wavelengths included within the detected optical signal. In some implementations, detector 250 may include a photo detector that detects an optical signal and outputs the electrical signal based on all or the portion of wavelengths associated with the optical signal. In some implementations, detector 250 may output another electrical signal based on a filtered version of the detected optical signal.

In some implementations, detector 250 may include a dual-etalon device that includes a frequency response on which wavelengths, associated with channels used for transmitting optical signals, are based. The frequency response may, for example, enable detector 250 to act as a stable reference on which wavelengths, of optical signals transmitted by optical transmitter 220, may be calibrated and/or tuned. The frequency response may be represented by a transfer function that is based on, for example, wavelengths and respective quantities of attenuation or gain. The transfer function, when acting as a stable reference, may not change by an amount that is greater than a particular threshold over a period of time and/or may not change in varying conditions (e.g., associated with temperature, humidity, etc.). Detector 250 may output the other electrical signal based on the detected optical signal and the frequency response associated with the dual-etalon device.

Transmitter controller 260 may include one or more devices that provide, to one or more devices within transmitter module 210, signals that control conditions associated with an optical signal generated by transmitter module 210. In some implementations, transmitter controller 260 may be separate from and external to transmitter module 210. In some implementations, transmitter controller 260 may monitor and/or control optical signals generated by optical transmitter 220, and may enable a user to select a modulation format and/or a baud rate for the optical signals generated by optical transmitter 220. In some implementations, transmitter controller 260 may monitor conditions associated with the transmission of the optical signals, such as, for example, chromatic dispersion, polarization mode dispersion, polarization dependent loss, wavelength dependent loss, optical noise accumulation, cross-phase modulation, self-phase modulation, etc.

In some implementations, transmitter controller 260 may receive, from detector 250, a condition associated with an optical signal to be transmitted by transmitter module 210 to receiver 270. Based on the condition, transmitter controller 260 may instruct optical transmitter 220 to adjust one or more transmission parameters, associated with the optical signal, that cause the condition to be remedied. For example, transmission controller 260 may, for example, instruct optical transmitter 220 to increase or decrease a wavelength of the optical signal so that the optical signal may be wavelocked. In some implementations, transmission controller 260 may instruct optical transmitter 220 to increase or decrease a power level associated with the optical signal in order to remedy conditions associated with in-phase/quadrature phase (I/Q) gain imbalance, polarization gain imbalance, etc. In some implementations, transmission controller 260 may instruct optical transmitter 220 to increase or decrease a quadrature angle in order to remedy a condition associated with quadrature error, I/Q delay, etc.

In some implementations, optical transmitter 220 may include a digital signal processor (DSP) and a digital-to-analog converter (DAC). In some implementations, the DSP and the DAC may be implemented on a single integrated circuit, such as an application specific integrated circuit (ASIC). The DSP may include a digital signal processor or a collection of digital signal processors. In some implementations, the DSP may receive input signals 205, process signals 205, and output digital signals having symbols that represent components of input signals 205. In some implementations, the DSP may digitally modulate the signal by mapping bits, associated with the signal, to the symbols. In some implementations, the DSP may add forward error correction parity bits to the symbols. In some implementations, the DSP may digitally modulate the signal using a particular modulation format (e.g., the QPSK modulation format, the QAM modulation format, or some other modulation format). In some implementations, the DSP may apply spectral shaping and/or perform filtering to the signal. The DAC may include a signal converting device or a collection of signal converting devices. In some implementations, the DAC may receive the digital signal from the DSP, convert the received digital signals to analog signals, and provide the analog signals to a modulator associated with optical transmitter 220. The analog signals may correspond to electrical signals (e.g., voltages) to drive the modulator.

Receiver module 270 may include one or more devices that receive an optical signal from transmitter module 210, and/or process the optical signal. In some implementations, receiver module 270 may be a coherent optical receiver. In some implementations, receiver module 270 may receive the optical signal, and may demultiplex the optical signal (e.g., using one or more demultiplexers and/or wave-division demultiplexing techniques) to create one or more optical signals. In some implementations, receiver module 270 may demodulate the optical signals (e.g., using one or more demodulators) and/or may remove symbols associated with control sequences, that were inserted into the optical signal by optical transmitter 220, to recover one or more electrical signals. In some implementations, receiver module 270 may transmit the one or more electrical signals to one or more other devices.

As shown in FIG. 2, receiver module 270 may include a demultiplexer 272, optical receivers 274, and a coherent processor 276. Demultiplexer 272 may supply multiple signal channels based on an optical signal received from transmitter module 210. In some implementations, optical demultiplexer 272 may supply signal channels to optical receivers 274 via waveguides. The waveguides may include optical links that transmit outputs of demultiplexer 272 to optical receivers 274. In some implementations, each optical receiver 274 may receive outputs via a single waveguide or via multiple waveguides.

Each optical receiver 274 may convert an input optical signal to an electrical signal that represents the transmitted data. In some implementations, each optical receiver 274 may include one or more photodetectors and/or related devices to receive respective input optical signals outputted by demultiplexer 272 and a local oscillator, convert the signals to a photocurrent, and provide a voltage output to function as an electrical signal representation of the incoming optical signal. Coherent processor 276 may receive the output voltage from optical receiver 274 and may use coherent signal processing techniques and/or forward error correction to regenerate the original input signals 205 as output signals 280.

The number of devices shown in FIG. 2 is provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
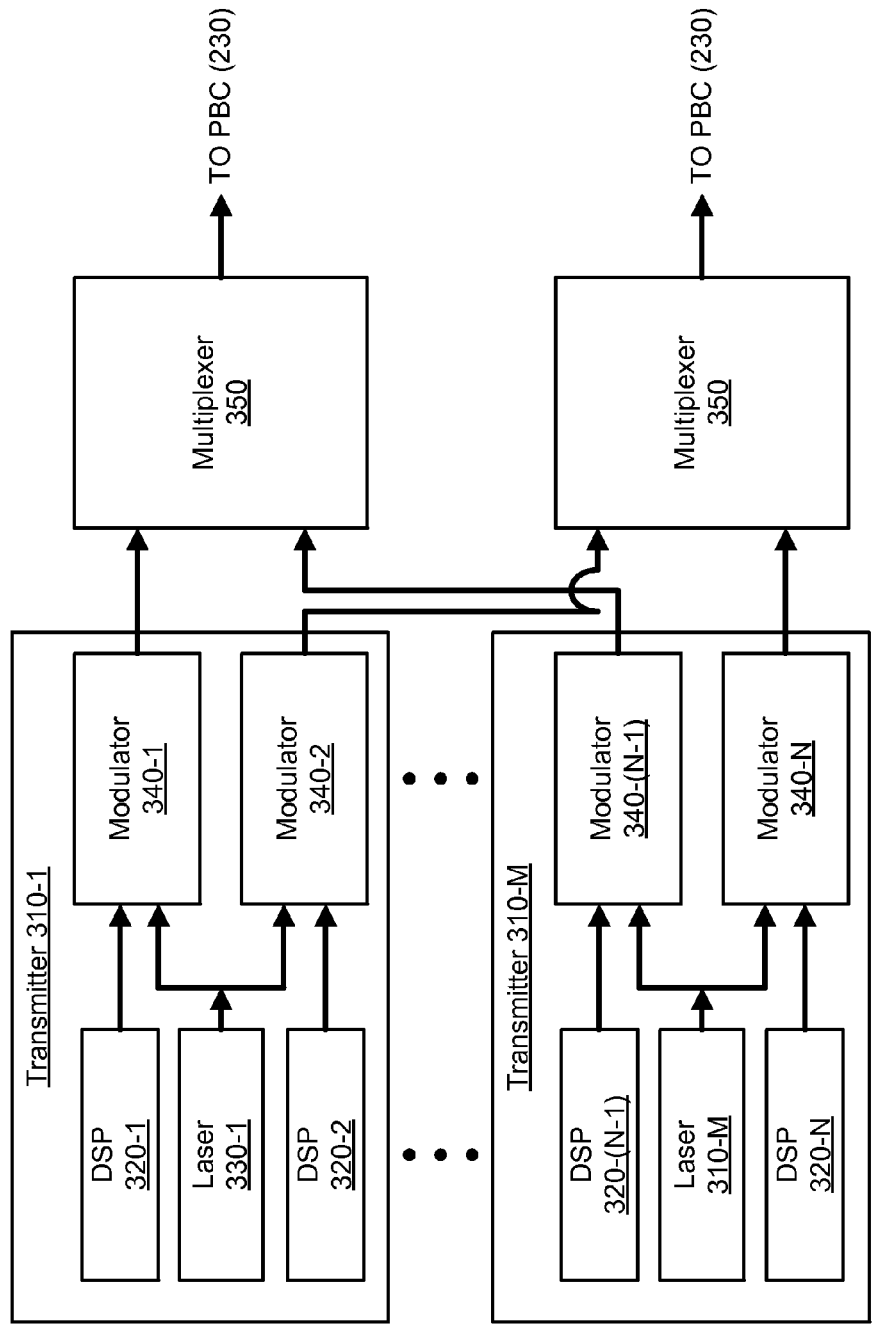
FIG. 3 is a diagram of example components of an optical transmitter depicted in FIG. 2.

FIG. 3 is a diagram of example components of multiplexed optical transmitter 220 (FIG. 2). As shown, multiplexed optical transmitter 220 may include a group of transmitters 310-1, . . . , 310-M (where M≥1) (hereinafter referred to collectively as "transmitters 310" and, in some instances, individually as "transmitter 310"), a group of digital signal processors and digital-to-analog converters 320-1, . . . , 320-N (where N≥1) (hereinafter referred to collectively as "DSPs 320" and, in some instances, individually as "DSP 320"), a group of lasers 330-1, . . . , 330-M (where M≥1) (hereinafter referred to collectively as "lasers 330" and, in some instances, individually as "laser 330"), a group of modulators 340-1, . . . , 340-N (where N≥1) (hereinafter referred to collectively as "modulators 340" and, in some instances, individually as "modulator 340"), and a pair of multiplexers 350.

Transmitter 310 may include one or more components that generate an optical signal that is outputted to multiplexer 350. DSP 320 may include a digital signal processor or a collection of digital signal processors. In some implementations, DSP 320 may receive a signal, process the signal, and output digital signals having symbols that represent components of the signal. In some implementations, DSP 320 may digitally modulate the signal by mapping bits, associated with the signal, to the symbols. In some implementations, DSP 320 may digitally modulate the signal using a particular modulation format (e.g., the QPSK modulation format, the QAM modulation format, or some other modulation format). In some implementations, DSP 320 may apply spectral shaping and/or perform filtering to the signal.

Laser 330 may include one or more components that generate an optical signal that is outputted to modulator 320. In some implementations, laser 330 may include a laser that generates and/or transmits an optical signal at a particular wavelength and/or with a particular bandwidth. In some implementations, laser 330 may tune and/or calibrate the optical signal based on an instruction received from transmitter controller 260 (FIG. 2). In some implementations, laser 330 may increase or decrease a wavelength of the optical signal in order to enable a condition, associated with the optical signal, to be remedied or mitigated.

In some implementations, each DSP 320 may receive a data channel (TxCh1 through TxChN), encode the signal, and send the encoded signal to modulator 340. In some implementations, transmitter module 210 may include 5, 10, 20, 50, 100, or some other number of transmitters 310. Each laser 330 may be tuned to use an optical carrier of a designated wavelength. In some implementations, a grid of wavelengths emitted by lasers 330 may conform to a known standard, such as a standard published by the Telecommunication Standardization Sector (ITU-T).

In some implementations, each laser 330 may include a semiconductor optical amplifier (SOA). The laser 330 and/or SOA may be coupled with a tuning element (e.g., a heater) that can be used to tune the wavelength of an optical signal channel output by the laser 330 or SOA. In some implementations, a single laser 330 may be shared by multiple transmitters 310.

Modulator 340 may include one or more components that modulate an optical signal received from laser 330 using signals from DSP 320. In some implementations, modulator 340 may receive an optical signal from laser 330, and may modulate a first component of the optical signal (e.g., a first polarization) using a signal received from DSP 320 (FIG. 2). Modulator 340 may modulate the first component of the optical signal to create a modulated optical signal associated with the first polarization. In some implementations, modulator 340 may modulate the optical signal using a modulation format (e.g., QPSK, 8-QAM, 16-QAM, etc.) selected by a user and provided by transmitter controller 260 to DSP 320. In some implementations, modulator 340 may provide the modulated first component of the optical signal to a first multiplexer 350. Another modulator 340 may, in the manner described above, modulate a second component of the optical signal (e.g., a second polarization), and may provide the modulated second component of the optical signal to a second multiplexer 350.

In some implementations, modulator 340 may increase or decrease a quadrature angle, associated with a real and/or imaginary component of the optical signal, based on an instruction received from transmitter controller 260. In some implementations, modulator 340 may adjust a phase angle associated with one or more phase modulation states, such as one or more of the four states associated with QPSK techniques, based on an instruction received from transmitter controller 260.

Multiplexer 350 may include one or more components that multiplex optical signals received from one or more modulators 340. In some implementations, a first multiplexer 350 may multiplex one or more modulated first components of optical signals received from a first set of modulators 340 (e.g., using WDM techniques) into a single first optical signal with multiple wavelengths. In some implementations, each of the modulated first components may correspond to a respective one of the wavelengths. The first multiplexer 330 may provide the single first optical signal to PBC 230. In some implementations, a second multiplexer 350 may, as described above, multiplex one or more modulated second components of optical signals received from a second set of modulators 340 into a single second optical signal, and may provide the single second optical signal to PBC 230.

In some implementations, multiplexer 350 may include an arrayed waveguide grating (AWG) or some other multiplexing device. In some implementations, multiplexer 350 may combine multiple signal channels, associated with transmitters 310, into an optical signal, such as a wave division multiplexed (WDM) signal.

In some implementations, a photonic integrated circuit (PIC) may include components, arranged on a common substrate, such as a laser (e.g., laser 330) associated with a particular wavelength, a modulator (e.g., modulator 340) configured to modulate the output of the laser, and a multiplexer (e.g., multiplexer 350) to combine each of the modulated outputs (e.g., to form a combined output or WDM signal).

The number of components shown in FIG. 3 is provided as an example. In practice, optical transmitter 220 may include additional components, fewer components, different components, or differently arranged components than those shown in FIG. 3. Additionally, or alternatively, one or more components of optical transmitter 220 may perform one or more functions described as being performed by another one or more components of optical transmitter 220.

Figure 4:
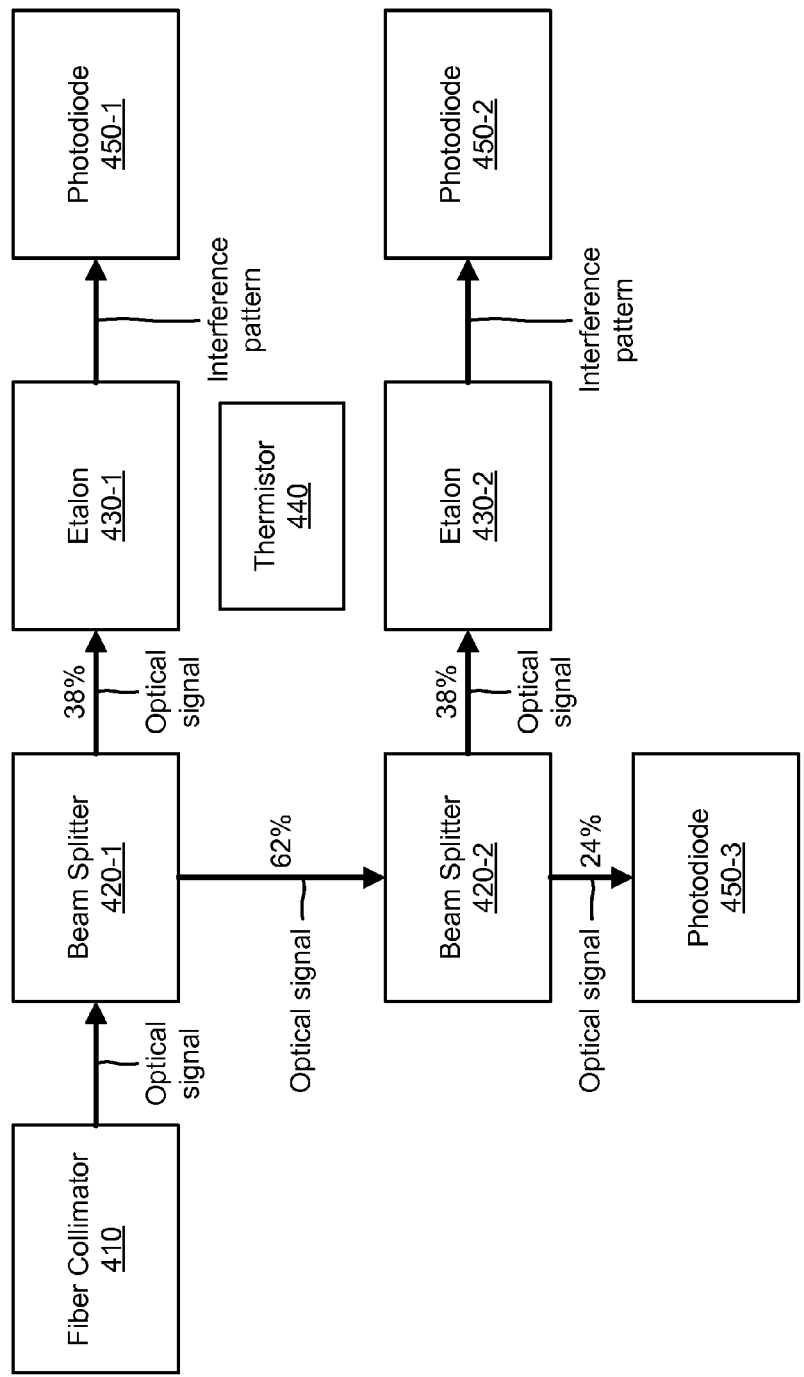
FIG. 4 is a diagram of example components of a detector depicted in FIG. 2.

FIG. 4 is a diagram of example components of detector 250 (FIG. 2). As shown, detector 250 may include a fiber collimator 410, a pair of beam splitters 420-1 and 420-2 (hereinafter referred to collectively as "beam splitters 420" and, in some instances, individually as "beam splitter 420"), a pair of etalons 430-1 and 430-2 (hereinafter referred to collectively as "etalons 430" and, in some instances, individually as "etalon 430"), a thermistor 440, and three photodiodes 450-1, 450-2, and 450-3 (hereinafter referred to collectively as "photodiodes 450" and, in some instances, individually as "photodiode 450").

Fiber collimator 410 may include one or more components that cause optical signal to be more aligned in a specific direction (e.g., collimated or parallel). In some implementations, fiber collimator 410 may receive the optical signal from amplifier 240 (FIG. 2), and may cause the optical signal to be more aligned in a collimated or parallel direction. Fiber collimator 410 may provide the aligned optical signal to beam splitter 420-1. In some implementations, fiber collimator 410 may include a curved mirror or a lens.

Beam splitter 420 may include one or more components that split an optical signal into two optical signals. In some implementations, beam splitter 420-1 may receive the aligned optical signal from fiber collimator 410, and may split the aligned optical signal into two optical signals. Beam splitter 420-1 may provide one optical signal to etalon 430-1, and may provide the other optical signal to beam splitter 420-2. In some implementations, beam splitter 420-1 may split the aligned optical signal into unequal or equal portions. For example, as shown in FIG. 4, beam splitter 420-1 may provide thirty-eight percent (38%) of the aligned optical signal to etalon 430-1, and may provide sixty-two percent (62%) of the aligned optical signal to beam splitter 420-2. In another example, beam splitter 420-1 may provide half (50%) of the aligned optical signal to etalon 430-1, and may provide half (50%) of the aligned optical signal to beam splitter 420-2. In yet another example, beam splitter 420-1 may split the aligned optical signal in some other amount.

In some implementations, beam splitter 420-2 may split the remaining optical signal received from beam splitter 420-1 into unequal or equal portions. For example, as shown in FIG. 4, beam splitter 420-2 may provide thirty-eight percent (38%) of the remaining optical signal to etalon 430-2, and may provide twenty-four percent (24%) of the remaining optical signal to photodiode 450-3. In another example, beam splitter 420-2 may provide half (50%) of the remaining optical signal to etalon 430-2, and may provide half (50%) of the remaining optical signal to photodiode 450-3.

Etalon 430 may include one or more components that control and measure a wavelength of an optical signal. In some implementations, etalon 430 may include a pair of partially reflective glass optical flats that are spaced apart and include reflective surfaces facing each other. An optical signal may enter etalon 430, and some of the optical signal may travel through etalon 430. Some of the optical signal may reflect off one optical flat of etalon 430, and may travel towards the other optical flat of etalon 430. The other optical flat may reflect the optical signal back through etalon 430. Thus, multiple reflections of the optical signal may occur in etalon, which may create an interference pattern that depends on a wavelength of the optical signal. In some implementations, etalon 430-1 may receive the optical signal from beam splitter 420-1, and may provide the interference pattern, created by etalon 430-1 based on the optical signal, to photodiode 450-1. In some implementations, etalon 430-2 may receive the optical signal from beam splitter 420-2, and may provide the interference pattern, created by etalon 430-2 based on the optical signal, to photodiode 450-2.

In some implementations, etalon 430-1 may include a free spectral range that is different than a free spectral range of etalon 430-2 so that either etalon 430-1 or etalon 430-2 may be used for wavelocking a selected modulation format and/or baud rate. A free spectral range may include the wavelength spacing between two successive reflected or transmitted optical intensity maxima or minima of etalon 430. For example, etalon 430-1 may include a free spectral range of nineteen (19) GHz and etalon 430-2 may include a free spectral range of twenty-five (25) GHz. In some implementations, the free spectral ranges of etalons 430 may be set to other wavelengths depending upon the modulation formats and/or baud rates supported by transmitter module 210.

Thermistor 440 may include one or more components that measure temperatures associated with etalons 430. In some implementations, thermistor 440 may include a resistor whose resistance varies with temperature. In some implementations, thermistor 440 may provide the measured temperatures of etalons 430 to a control component (e.g., a fan) of transmitter module 210 that controls the temperatures of the components of transmitter module 210. In such implementations, the control component may cool etalons 430 if the measured temperatures of etalons 430 are above a particular temperature threshold.

Photodiode 450 may include one or more components that receive an optical signal, and convert the optical signal into an electrical signal (e.g., by generating an electrical current proportional to an intensity of incident optical radiation). In some implementations, photodiode 450 may include a semiconductor positive-intrinsic-negative (PIN) photodiode, an avalanche photodiode (APD), etc. Photodiode 450 may provide the electrical signal to transmitter controller 260 (FIG. 2). In some implementations, each of photodiodes 450 may provide different electrical signals to transmitter controller 260. For example, photodiode 450-1 may receive the interference pattern created by etalon 430-1 based on the optical signal, and may convert the interference pattern into an electrical signal. Photodiode 450-1 may provide the electrical signal, indicative of the interference pattern created by etalon 430-1, to transmitter controller 260. In another example, photodiode 450-2 may receive the interference pattern created by etalon 430-2 based on the optical signal, and may convert the interference pattern into an electrical signal. Photodiode 450-2 may provide the electrical signal, indicative of the interference pattern created by etalon 430-2, to transmitter controller 260. In still another example, photodiode 450-3 may receive the optical signal from beam splitter 420-2, and may convert the optical signal into an electrical signal. Photodiode 450-3 may provide the electrical signal, indicative of the optical signal, to transmitter controller 260.

The number of components shown in FIG. 4 is provided as an example. In practice, detector 250 may include additional components, fewer components, different components, or differently arranged components than those shown in FIG. 4. Additionally, or alternatively, one or more components of detector 250 may perform one or more functions described as being performed by another one or more components of detector 250.

Figure 5:
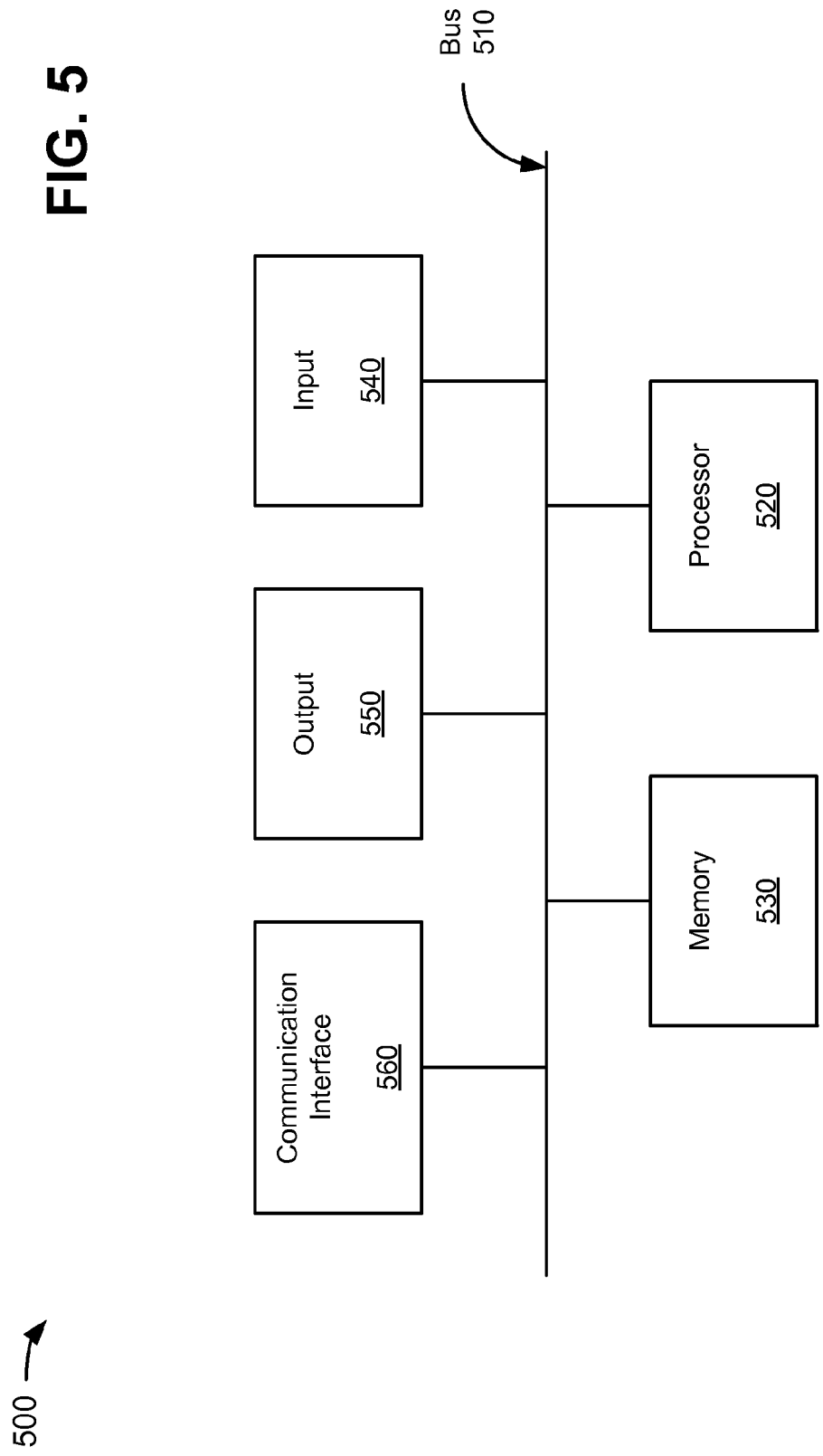
FIG. 5 is a diagram of example components of a transmitter controller depicted in FIG. 2.

FIG. 5 is a diagram of example components of a device 500 that may correspond to transmitter controller 260 (FIG. 2). In some implementations, transmitter controller 260 may include one or more devices 500 or one or more components of device 500. As shown in FIG. 5, device 500 may include a bus 510, a processor 520, a memory 530, an input component 540, an output component 550, and a communication interface 560.

Bus 510 may include a path that permits communication among the components of device 500. Processor 520 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 520 may include multiple processor cores for parallel computing. Memory 530 may include a random access memory (RAM), a read only memory (ROM), and/or another type of dynamic or static storage component (e.g., a flash, magnetic, or optical memory) that stores information and/or instructions for use by processor 520.

Input component 540 may include a component that permits a user to input information to device 500 (e.g., a touch screen display, a keyboard, a keypad, a mouse, a button, a switch, etc.). Output component 550 may include a component that outputs information from device 500 (e.g., a display, a speaker, one or more light-emitting diodes (LEDs), etc.).

Communication interface 560 may include a transceiver-like component, such as a transceiver and/or a separate receiver and transmitter, which enables device 500 to communicate with other devices, such as via a wired connection, a wireless connection, or a combination of wired and wireless connections. For example, communication interface 560 may include an Ethernet interface, an optical interface, a coaxial interface, an infrared interface, a radio frequency (RF) interface, a universal serial bus (USB) interface, a high-definition multimedia interface (HDMI), or the like.

Device 500 may perform various operations described herein. Device 500 may perform these operations in response to processor 520 executing software instructions included in a computer-readable medium, such as memory 530. A computer-readable medium is defined as a non-transitory memory device. A memory device includes memory space within a single physical storage device or memory space spread across multiple physical storage devices.

Software instructions may be read into memory 530 from another computer-readable medium or from another device via communication interface 560. When executed, software instructions stored in memory 530 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 5 is provided as an example. In practice, device 500 may include additional components, fewer components, different components, or differently arranged components than those shown in FIG. 5. Additionally, or alternatively, one or more components of device 500 may perform one or more functions described as being performed by another one or more components of device 500.

Figure 6:
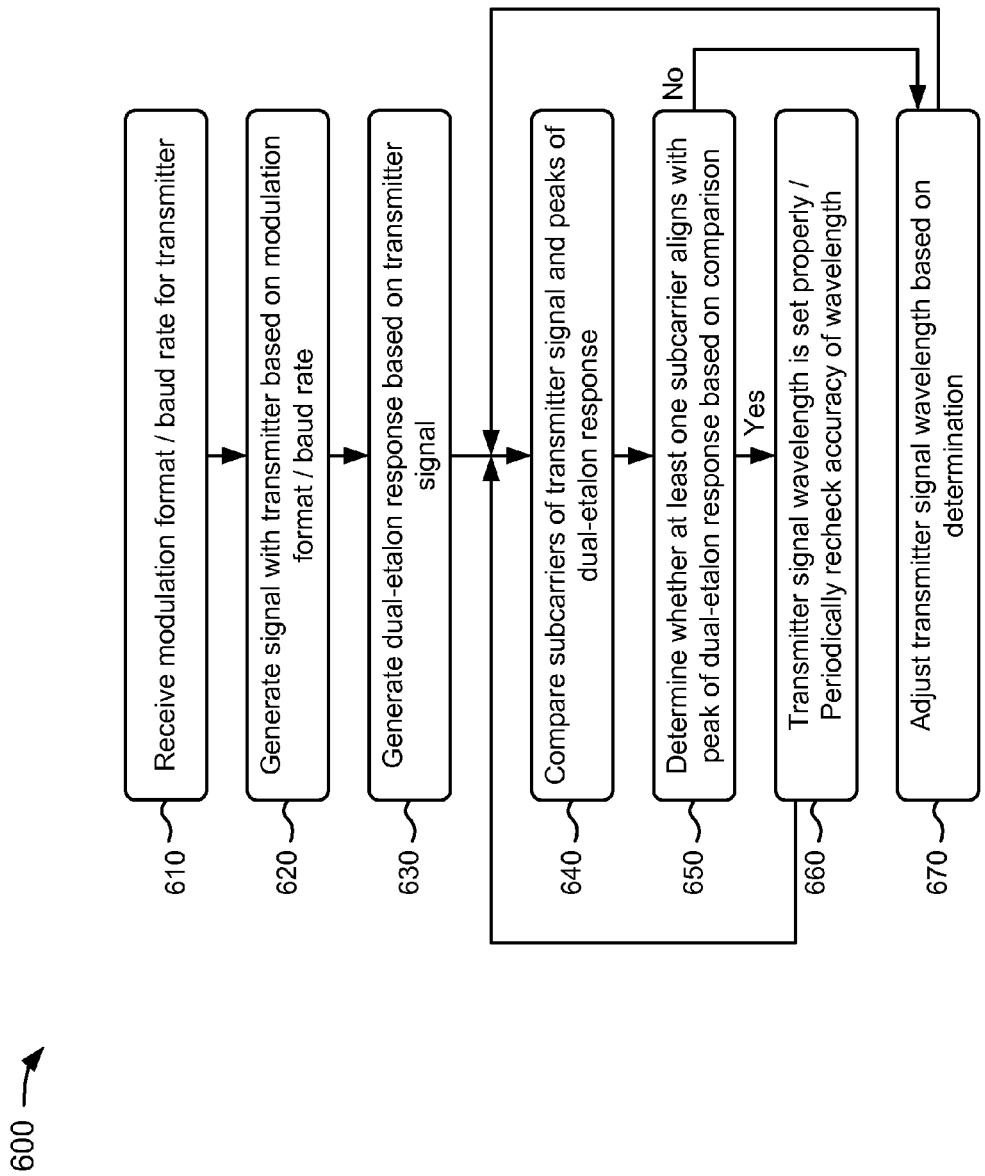
FIG. 6 is a flow chart of an example process for controlling an optical transmitter that supports multiple modulation formats and/or baud rates.

FIG. 6 is a flow chart of an example process 600 for controlling an optical transmitter that supports multiple modulation formats and/or baud rates. In some implementations, one or more process blocks of FIG. 6 may be performed by transmitter module 210. In some implementations, one or more process blocks of FIG. 6 may be performed by another device or a group of devices separate from or including transmitter module 210.

As shown in FIG. 6, process 600 may include receiving a modulation format and a baud rate for a transmitter (block 610). For example, a user may utilize transmitter module 210 for providing optical signals along an optical fiber to receiver module 270. In some implementations, the user may determine a modulation format and/or a baud rate for transmitter module 210 based on a length of optical fiber and/or a desired spectral efficiency. For example, if the length of the optical fiber is less than or equal to 500 km, the user may select a 16-QAM modulation format and a 16.5 GBd baud rate. If the length of the optical fiber is greater than 500 km and less than or equal to one-thousand 1,500 km, the user may select an 8-QAM modulation format and a 22 GBd baud rate. If the length of the optical fiber is greater than 1,500 km, the user may select a QPSK modulation format and a 33 GBd baud rate. In some implementations, the user may select a modulation format and an approximate baud rate or a range of baud rates for the selected modulation format.

In some implementations, the user may provide, to transmitter module 210, the modulation format and/or the baud rate for transmitter module 210, and transmitter module 210 (e.g., transmitter controller 260) may receive the modulation format and/or the baud rate. In some implementations, transmitter controller 260 may include or be associated with a user interface that enables the user to input the modulation format and/or the baud rate. In some implementations, the user interface may request additional information from the user, such as, for example, positions of wavelength channels of transmitter module 210, a number of wavelength channels, etc.

In some implementations, transmitter controller 260 may automatically determine the modulation format and/or the baud rate for transmitter module 210. For example, transmitter controller 260 may instruct transmitter module 210 to send an optical signal to receiver module 270, and may measure a transmission time associated with the optical signal. Transmitter controller 260 may determine the length of the optical fiber based on the transmission time, and may select the modulation format and/or the baud rate based on the determined length of the optical fiber.

As further shown in FIG. 6, process 600 may include generating a signal with the transmitter based on the modulation format and the baud rate (block 620). For example, transmitter controller 260 may instruct one or more transmitters 310 of optical transmitter 220 to generate an optical signal based on the modulation format and the baud rate provided by the user. In some implementations, each of the one or more transmitters 310 may transmit an optical transmitter signal at a particular wavelength that is different than wavelengths transmitted by the other transmitters 310. In some implementations, optical transmitter 220 may support communications over a number of wavelength channels. For example, optical transmitter 220 may support multiple channels over a particular wavelength range (e.g., the C band from 1530 to 1565 nm, the L band from 1565 to 1625 nm, etc).

In some implementations, transmitter controller 260 may instruct optical transmitter 220 to change the channel spacing of the transmitter signals based on the modulation format and the baud rate provided by the user. For example, if the user provided a 16-QAM modulation format and a 16.5 GBd baud rate, transmitter controller 260 may instruct optical transmitter 220 to set the channel spacing of the transmitter signals to 19 GHz. If the user provided an 8-QAM modulation format and a 22 GBd baud rate, transmitter controller 260 may instruct optical transmitter 220 to set the channel spacing of the transmitter signals to 25 GHz. If the user provided a QPSK modulation format and a 33 GBd baud rate, transmitter controller 260 may instruct optical transmitter 220 to set the channel spacing of the transmitter signals to 38 GHz.

As further shown in FIG. 6, process 600 may include generating a dual-etalon response based on the transmitter signal (block 630). For example, detector 250 may receive the optical signal (e.g., with the multiple transmitter signals) from optical transmitter 220, and may generate a dual-etalon response based on the modulation format and the baud rate provided by the user. In some implementations, detector 250 may periodically or continuously sample the optical signal generated by optical transmitter 220. For example, detector 250 may sample the optical signal generated by optical transmitter 220 after a particular amount of time (e.g., in microseconds, seconds, etc.). The particular amount of time may be provided by the user to transmitter module 210 or may be preprogrammed in transmitter module 210. In some implementations, detector 250 may sample the optical signal generated by optical transmitter 220 more or less frequently depending upon a state of transmitter module 210 (e.g., if the temperature of transmitter module 210 is fluctuating, detector 250 may sample the optical signal more frequently).

In some implementations, the optical signal or a portion of the optical signal generated by optical transmitter 220 may be received by detector 250, and may be provided to etalons 430 of detector 250. Etalons 430 may create interference patterns that depend on a wavelength of the received optical signal. For example, etalon 430-1 may receive the optical signal, and may provide the interference pattern, created by etalon 430-1 based on the optical signal, to photodiode 450-1. Etalon 430-2 may receive the optical signal, and may provide the interference pattern, created by etalon 430-2 based on the optical signal, to photodiode 450-2. Photodiodes 450-1 and 450-2 may create electrical signals based on the interference patterns received from etalons 430-1 and 430-2, respectively.

In some implementations, transmission controller 260 may utilize electrical signals that correspond to the interference pattern created by etalon 430-1 (e.g., and received by photodiode 450-1) or to the interference pattern created by etalon 430-2 (e.g., and received by photodiode 450-2), depending upon the modulation format and the baud rate provided by the user. For example, if the user provided a 16-QAM modulation format and a 16.5 GBd baud rate or a QPSK modulation format and a 33 GBd baud rate, transmitter controller 260 may utilize electrical signals that correspond to the interference pattern created by etalon 430-1. In such an example, transmitter controller 260 may utilize the interference pattern created by etalon 430-1 since the 16-QAM and QPSK modulation formats may require a channel spacing of 19 GHz and 38 GHz, respectively, and etalon 430-1 may include a free spectral range of 19 GHz. In another example, if the user provided an 8-QAM modulation format and a 22 GBd baud rate, transmitter controller 260 may utilize electrical signals that correspond to the interference pattern created by etalon 430-2. In such an example, transmitter controller 260 may utilize the interference pattern created by etalon 430-2 since the 8-QAM modulation format may require a channel spacing of 25 GHz, and etalon 430-2 may include a free spectral range of 25 GHz.

In some implementations, the optical signal generated by optical transmitter 220 may include subcarrier signals. For example, each transmitter signal generated by each transmitter 310 may include multiple (e.g., two, three, four, etc.) subcarrier signals. The subcarrier signals may include a portion of data transmitted by each transmitter signal. In some implementations, detector 250 may receive the optical signal (e.g., with the multiple transmitter signals and multiple subcarrier signals) generated by optical transmitter 220, and may provide the optical signal to photodiode 450-3. Photodiode 450-3 may create an electrical signal based on the optical signal, and may provide the electrical signal to transmitter controller 260.

As further shown in FIG. 6, process 600 may include comparing subcarriers of the transmitter signal and peaks of the dual-etalon response (block 640). For example, transmitter controller 260 may compare the subcarrier signals of each transmitter signal and peaks of the dual-etalon response. In some implementations, the interference patterns created by etalons 430 may include dual-etalon signals with peaks and troughs. In some implementations, transmitter controller 260 may compare the subcarrier signals of each transmitter signal to the peaks of the dual-etalon response in order to provide wavelength control of the transmitter signals at different modulation formats and/or baud rates. In some implementations, transmitter controller 260 may compare wavelengths of the subcarrier signals to wavelengths of the peaks of the dual-etalon response. In some implementations, the comparison between etalon peaks and subcarrier signals may be accomplished by transmitting sort bit sequences to isolate the wavelength of one subcarrier. In some implementations, the comparison between etalon peaks and subcarrier signals may be accomplished by amplitude modulating one subcarrier. In some implementations, the comparison between etalon peaks and subcarrier signals may be accomplished by adding narrow band pilot signals outside the bandwidth of the subcarrier.

As further shown in FIG. 6, process 600 may include determining whether at least one subcarrier of the transmitter signal aligns with a peak of the dual-etalon response based on the comparison (block 650). For example, based on the comparison of the subcarrier signals of each transmitter signal and the peaks of the dual-etalon response, transmitter controller 260 may determine whether at least one subcarrier signal aligns with a peak of the dual-etalon response. In some implementations, if transmitter controller 260 determines that at least one subcarrier signal of a particular transmitter signal (e.g., generated by a particular transmitter 310) aligns with a peak of the dual-etalon response, transmitter controller 260 may determine that a wavelength of the particular transmitter signal is correct. In some implementations, if transmitter controller 260 determines that no subcarrier signals of a particular transmitter signal (e.g., generated by a particular laser 330) align with a peak of the dual-etalon response, transmitter controller 260 may determine that a wavelength of the particular transmitter signal is incorrect and needs to be adjusted.

In some implementations, transmitter controller 260 may determine whether at least one subcarrier signal of each of the transmitter signals generated by optical transmitter 220 aligns with a peak of the dual-etalon signal. In such implementations, transmitter controller 260 may determine whether the wavelengths of all of the transmitter signals generated by optical transmitter 220 are correct or incorrect.

As further shown in FIG. 6, if at least one subcarrier of the transmitter signal is determined to align with a peak of the dual-etalon response (block 650—YES), process 600 may include determines that the transmitter signal wavelength is set properly and periodically rechecking the accuracy of the transmitter signal wavelength (block 660). For example, if transmitter controller 260 determines that at least one subcarrier signal of a particular transmitter signal (e.g., generated by a particular transmitter 310) aligns with a peak of the dual-etalon response, transmitter controller 260 may determine that a wavelength of the particular transmitter 310 is set properly and may be locked. In some implementations, if transmitter controller 260 determines that at least one subcarrier signal of each of the transmitter signals generated by optical transmitter 220 aligns with a peak of the dual-etalon response, transmitter controller 260 may lock the wavelengths of all transmitters 310 of optical transmitter 220. In such implementations, transmitter controller 260 may enable transmitter module 210 to lock the wavelengths of the transmitter signals for different modulation formats and/or baud rates. In some implementations, transmitter controller 260 may periodically recheck the accuracy of the wavelength of the particular transmitter 310.

As further shown in FIG. 6, if no subcarriers of the transmitter signal are determined to align with a peak of the dual-etalon response (block 650—NO), process 600 may include adjusting the transmitter signal wavelength based on the determination (block 670) and returning to process block 640. For example, if transmitter controller 260 determines that no subcarrier signals of a particular transmitter signal (e.g., generated by a particular transmitter 310) align with a peak of the dual-etalon response, transmitter controller 260 may adjust a wavelength of the particular transmitter 310. In some implementations, transmitter controller 260 may increase the wavelength of the particular transmitter 310 until at least one subcarrier signal of the particular transmitter signal aligns with a peak of the dual-etalon response. In some implementations, transmitter controller 260 may decrease the wavelength of the particular transmitter 310 until at least one subcarrier signal of the particular transmitter signal aligns with a peak of the dual-etalon response.

In some implementations, transmitter controller 260 may adjust one or more wavelengths of one or more transmitter signals, generated by optical transmitter 220, until at least one subcarrier signal of all of the transmitter signals aligns with a peak of the dual-etalon response. In such implementations, transmitter controller 260 may eventually lock the wavelengths of all transmitters 310 of optical transmitter 220 (e.g., after the one or more wavelengths are properly adjusted).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example 700 relating to example process 600 shown in FIG. 6. In example 700, assume that a user wants to utilize transmitter module 210 for providing optical signals along an optical fiber to receiver module 270. Further, assume that the user determines a modulation format and/or a baud rate for transmitter module 210 based on a length of optical fiber and/or a desired spectral efficiency. For example, if the length of the optical fiber is less than or equal to 500 km, the user may select a 16-QAM modulation format and a 16.5 GBd baud rate. If the length of the optical fiber is greater than 500 km and less than or equal to one-thousand 1,500 km, the user may select an 8-QAM modulation format and a 22 GBd baud rate. If the length of the optical fiber is greater than 1,500 km, the user may select a QPSK modulation format and a 33 GBd baud rate. The user may provide the selected modulation format and/or the selected baud rate to transmitter controller 260 of transmitter module 210, as indicated by reference number 710 in FIG. 7A.

Figure 7A:
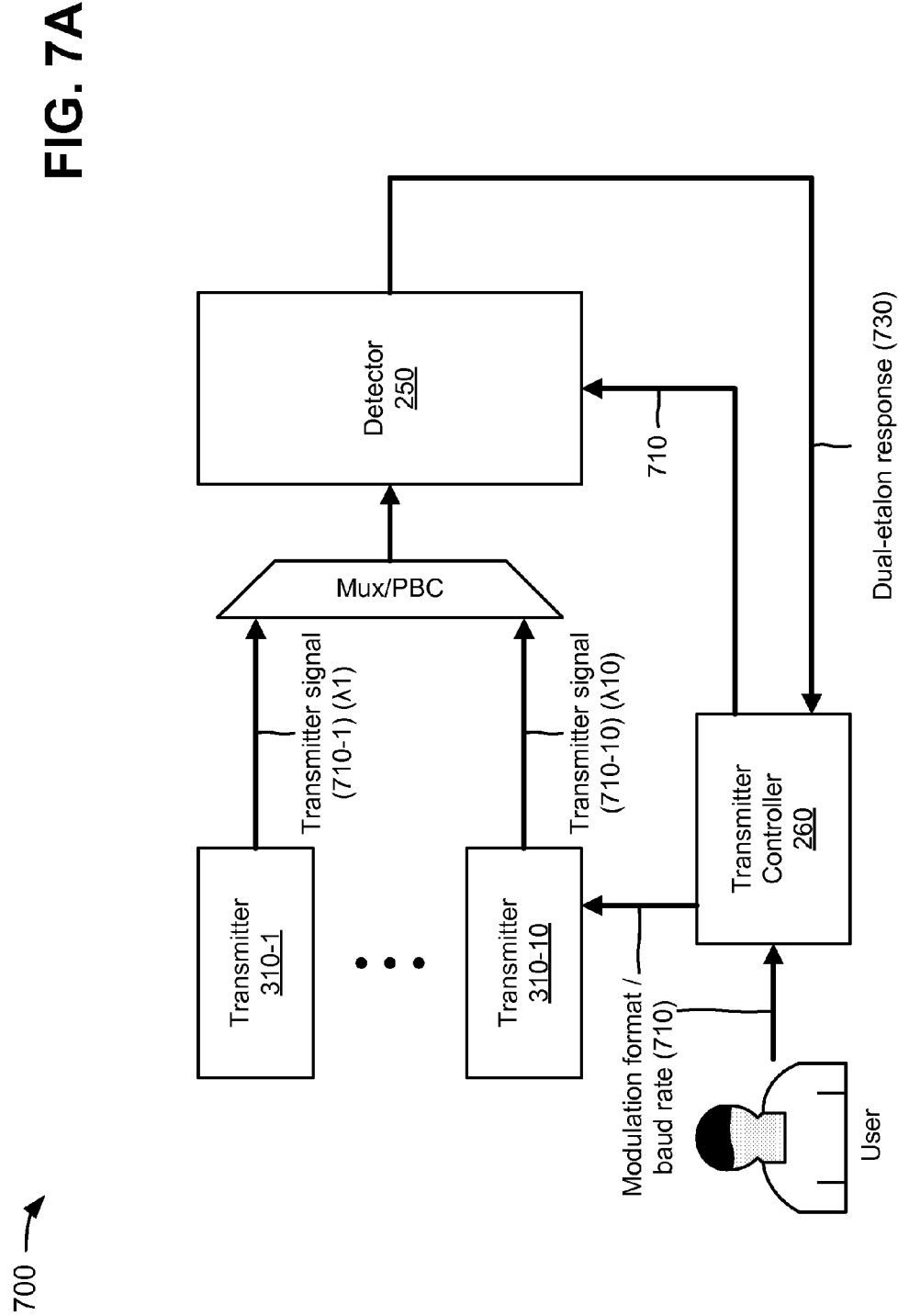
FIGS. 7A-7E are diagrams of an example relating to the example process shown in FIG. 6.

As further shown in FIG. 7A, transmitter controller 260 may provide modulation format/baud rate 710 to transmitters 310-1 through 310-10 (collectively referred to as "transmitters 310" and, in some instances, singularly as "transmitter 310") and to detector 250 of transmitter module 210. Transmitter controller 260 may provide additional information to transmitters 310 and/or detector 250. The additional information may include, for example, information indicating wavelengths to be generated by transmitters 310 based on modulation format/baud rate 710; information indicating which dual-etalon response to utilize (e.g., the signal produced by etalon 430-1 or the signal produced by etalon 430-2) based on modulation format/baud rate 710; information indicating how frequently detector 250 is to sample signals generated by transmitters 310; etc.

Based on modulation format/baud rate 710 and/or the additional information, transmitters 310-1 through 310-10 may generate optical transmitter signals 720-1 through 720-10 (collectively referred to as "transmitter signals 720"), as further shown in FIG. 7A. Each transmitter 310 may transmit transmitter signal 720 at a particular wavelength that is different than wavelengths transmitted by the other transmitters 310. For example, transmitter 310-1 may transmit transmitter signal 720-1 at a first wavelength ($\lambda 1$), transmitter 310-2 may transmit transmitter signal 720-2 at a second wavelength ($\lambda 2$) that is different than the first wavelength, . . . , and transmitter 310-10 may transmit transmitter signal 720-10 at a tenth wavelength ($\lambda 10$) that is different than the first through ninth wavelengths. As further shown in FIG. 7A, transmitters 310 may provide transmitter signals 720 to detector 250.

Detector 250 may generate a dual-etalon signal 730 based on modulation format/baud rate 710, transmitter signals 720, and/or the additional information. Detector 250 may provide transmitter signals 720 and dual-etalon signal 730 to transmitter controller 260, as further shown in FIG. 7A. Transmitter controller 260 may compare transmitter signals 720 and dual-etalon signal 730 to determine whether at least one subcarrier signal of each transmitter signal 720 aligns with a peak of dual-etalon signal 730. Such a comparison may depend upon modulation format/baud rate 710 since transmitter signals 720 and dual-etalon signal 730 may depend on modulation format/baud rate 710.

Figure 7B:
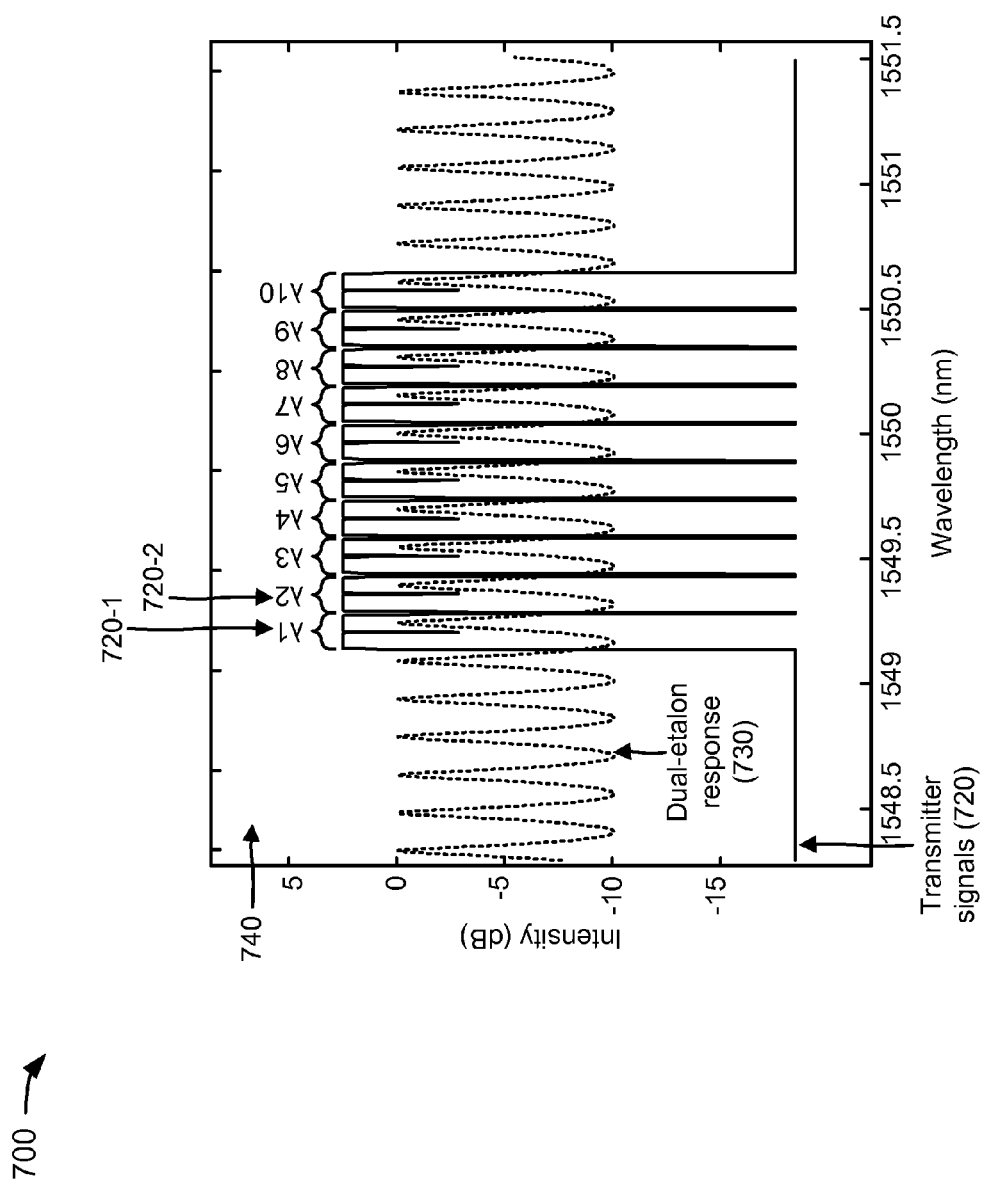

For example, if modulation format/baud rate 710 includes a 16-QAM modulation format and a 16.5 GBd baud rate, transmitter signals 720 may require a channel spacing of 19 GHz and dual-etalon signal 730 may be generated by etalon 430-1 with a free spectral range of 19 GHz. In such an example, transmitter controller 260 may compare transmitter signals 720 and dual-etalon signal 730 via a graph 740 that includes a wavelength axis (e.g., in GHz) and an intensity axis (e.g., in decibels (dB)), as shown in FIG. 7B. As shown in graph 740, each transmitter signal 720 may include two subcarrier signals (e.g., shown as two square peaks). For example, transmitter signal 720-1 at the first wavelength (λ1) may include two subcarrier signals, transmitter signal 720-2 at the second wavelength (λ2) may include two subcarrier signals, etc. As further shown in graph 740, dual-etalon signal 730 may include peaks and valleys. Since one subcarrier signal of each transmitter signal 720 aligns with a peak of dual-etalon signal 730 in FIG. 7B, transmitter controller 260 may determine that the wavelengths of transmitter signals 720 are correct.

Figure 7C:
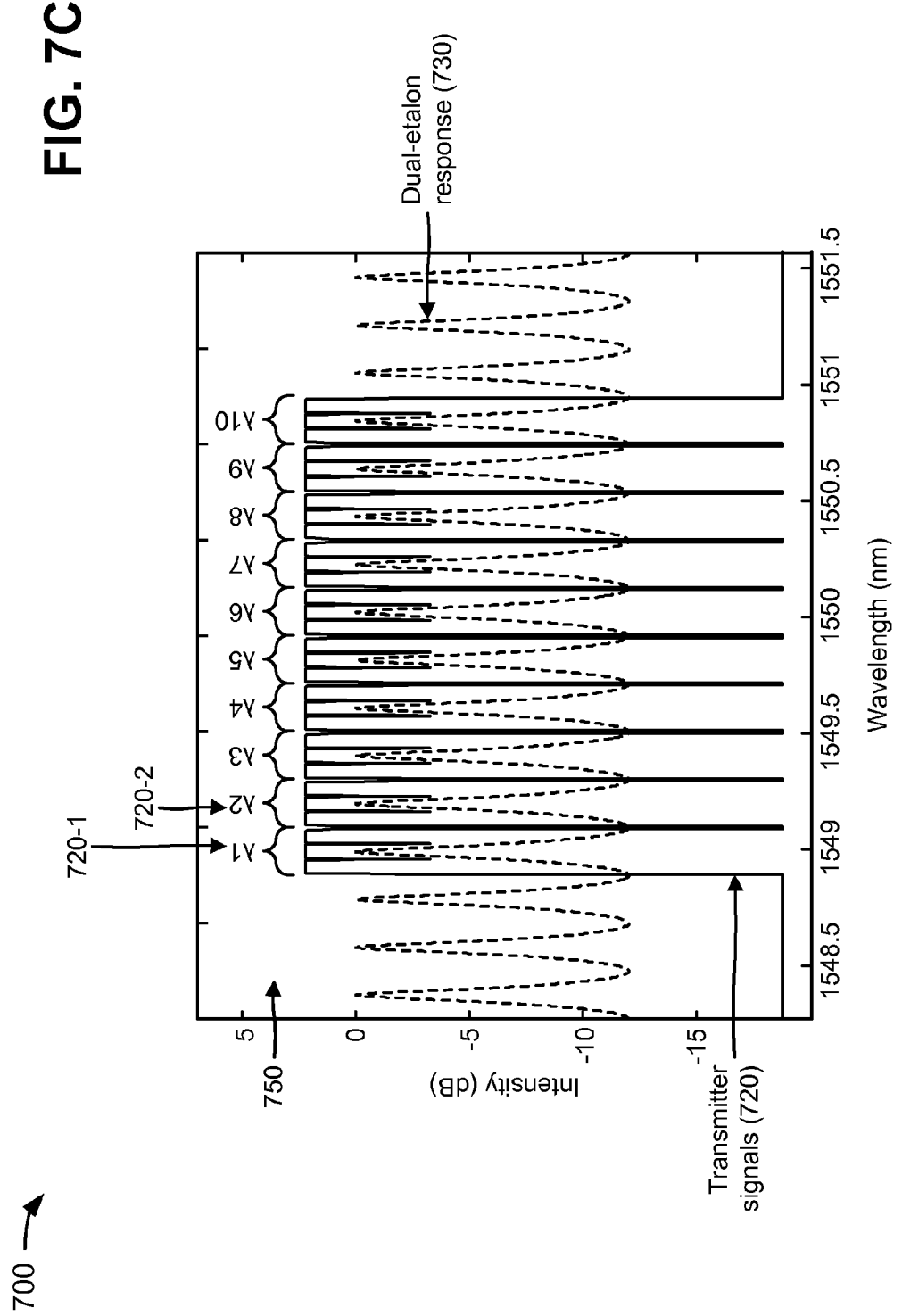

In another example, if modulation format/baud rate 710 includes an 8-QAM modulation format and a 22 GBd baud rate, transmitter signals 720 may require a channel spacing of 25 GHz and dual-etalon signal 730 may be generated by etalon 430-2 with a free spectral range of 25 GHz. In such an example, transmitter controller 260 may compare transmitter signals 720 and dual-etalon signal 730 via a graph 750 that includes a wavelength axis (e.g., in GHz) and an intensity axis (e.g., in dB), as shown in FIG. 7C. As shown in graph 750, each transmitter signal 720 may include three subcarrier signals (e.g., shown as three square peaks). For example, transmitter signal 720-1 at the first wavelength (λ1) may include three subcarrier signals, transmitter signal 720-2 at the second wavelength (λ2) may include three subcarrier signals, etc. As further shown in graph 750, dual-etalon signal 730 may include peaks and valleys. Since one subcarrier signal of each transmitter signal 720 aligns with a peak of dual-etalon signal 730 in FIG. 7C, transmitter controller 260 may determine that the wavelengths of transmitter signals 720 are correct.

Figure 7D:
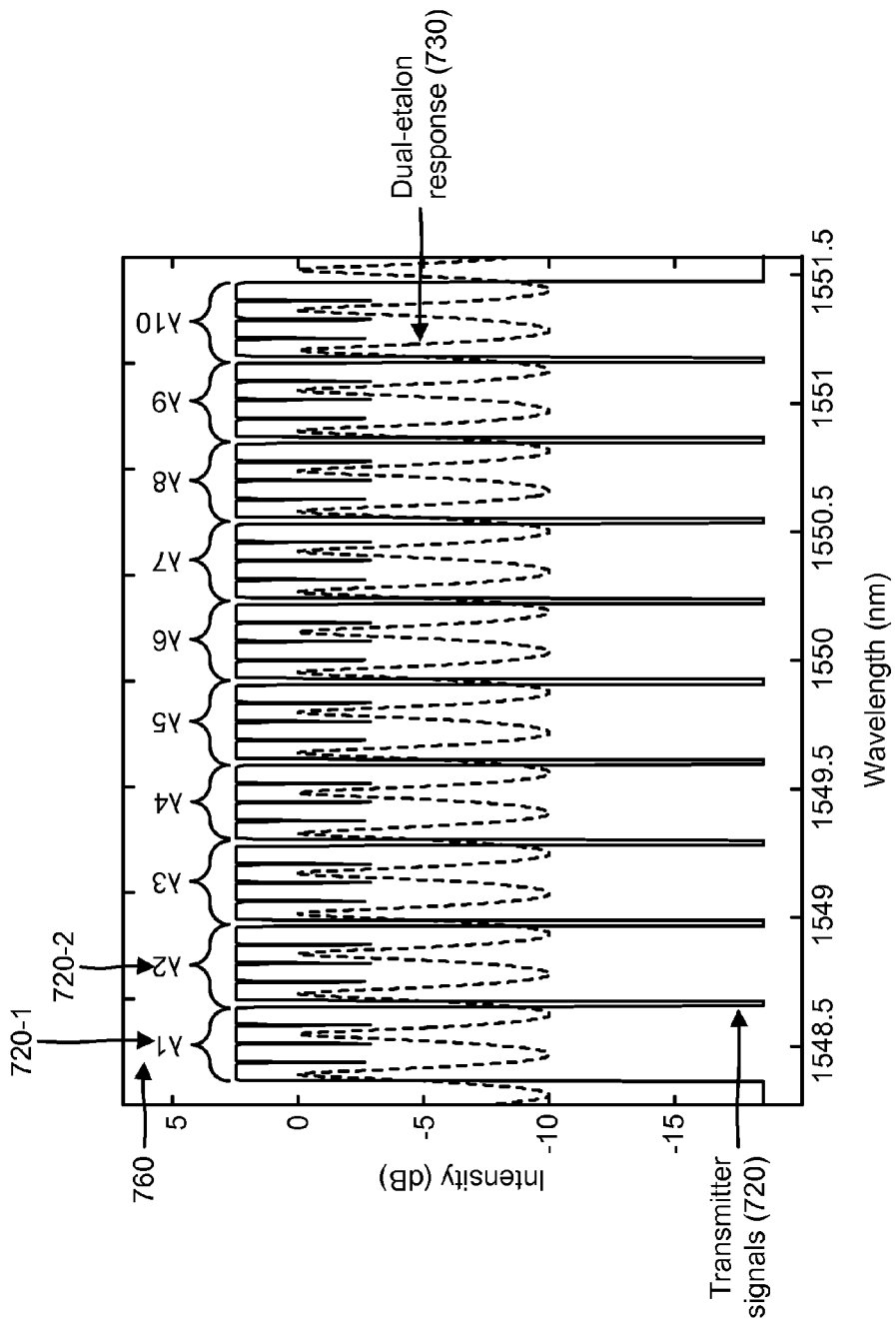

In still another example, if modulation format/baud rate 710 includes a QPSK modulation format and a 33 GBd baud rate, transmitter signals 720 may require a channel spacing of 38 GHz and dual-etalon signal 730 may be generated by etalon 430-1 with a free spectral range of 19 GHz. In such an example, transmitter controller 260 may compare transmitter signals 720 and dual-etalon signal 730 via a graph 760 that includes a wavelength axis (e.g., in GHz) and an intensity axis (e.g., in dB), as shown in FIG. 7D. As shown in graph 760, each transmitter signal 720 may include four subcarrier signals (e.g., shown as four square peaks). For example, transmitter signal 720-1 at the first wavelength (λ1) may include four subcarrier signals, transmitter signal 720-2 at the second wavelength (λ2) may include four subcarrier signals, etc. As further shown in graph 760, dual-etalon signal 730 may include peaks and valleys. Since two subcarrier signals of each transmitter signal 720 align with a peak of dual-etalon signal 730 in FIG. 7D, transmitter controller 260 may determine that the wavelengths of transmitter signals 720 are correct.

Figure 7E:
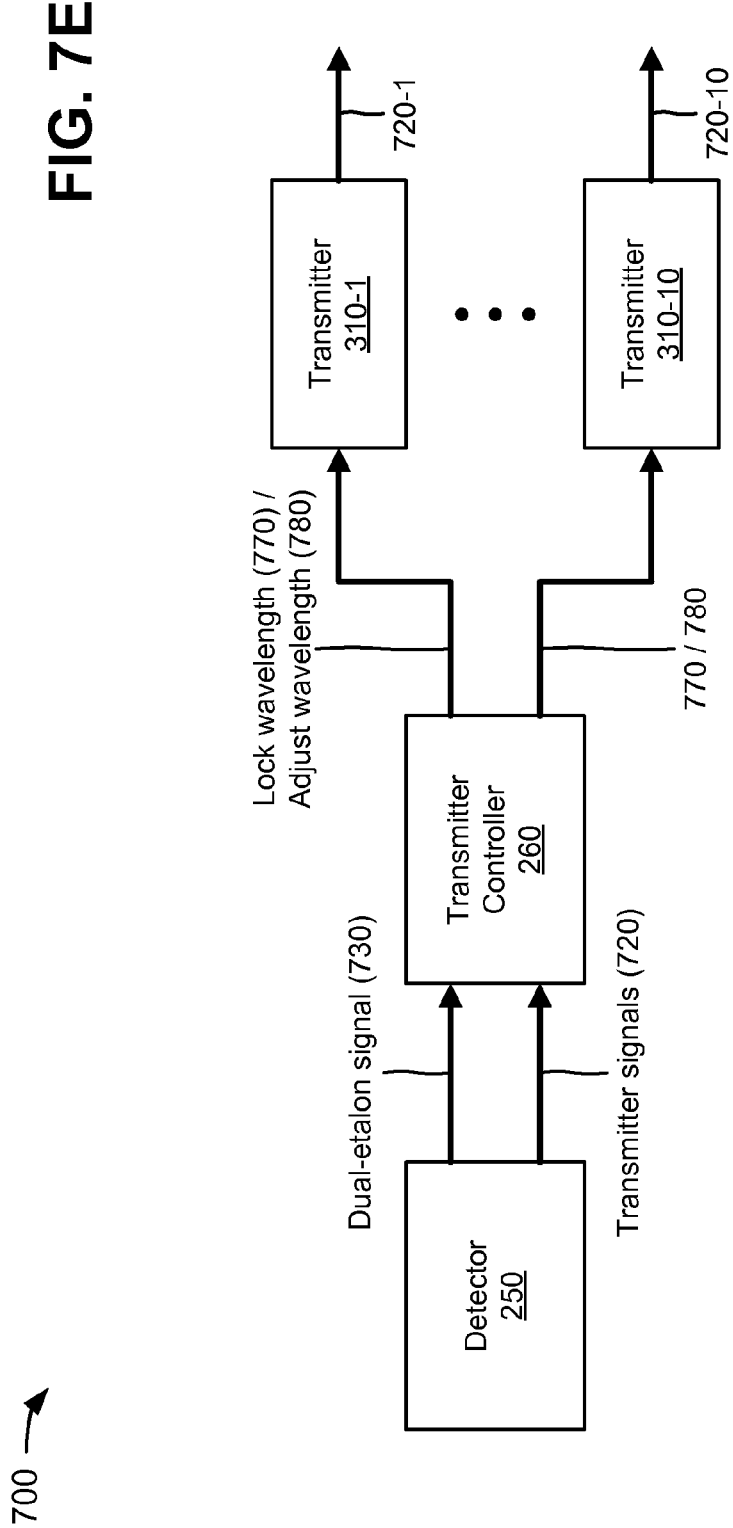

If transmitter controller 260 determines that at least one subcarrier signal of a particular transmitter signal 720 (e.g., generated by a particular transmitter 310) aligns with a peak of dual-etalon signal 730, transmitter controller 260 may lock a wavelength of the particular transmitter 310, as indicated by reference number 770 in FIG. 7E. For example, assume that at least one subcarrier signal of transmitter signals 720-1 and 720-10 (e.g., generated by transmitters 310-1 and 310-10) aligns with a peak of dual-etalon signal 730. In such an example, transmitter controller 260 may lock the wavelengths of transmitters 310-1 and 310-10.

If transmitter controller 260 determines that no subcarrier signals of a particular transmitter signal 720 (e.g., generated by a particular transmitter 310) align with a peak of dual-etalon signal 730, transmitter controller 260 may adjust a wavelength of the particular transmitter 310, as indicated by reference number 780 in FIG. 7E. For example, assume that at least one subcarrier signal of transmitter signal 720-1 (e.g., generated by transmitter 310-1) aligns with a peak of dual-etalon signal 730, and that no subcarrier signals of transmitter signal 720-10 (e.g., generated by transmitter 310-10) align with a peak of dual-etalon signal 730. In such an example, transmitter controller 260 may lock the wavelength of transmitter 310-1, and may adjust the wavelength of transmitter 310-10.

As shown in example 700, transmitter module 210 may be dynamically configured to different modulation formats and/or baud rates, and may be controlled at the different modulation formats and/or baud rates. A wavelength channel spacing of transmitter module 210 may be altered based on a selected modulation format and/or baud rate. Transmitter module 210 may accurately determine and lock wavelengths of transmitters 310, which may enable the channel spacing of the transmitter signals to be accurately aligned.

As indicated above, FIGS. 7A-7E are provided merely as an example. Other examples are possible and may differ from what was described with regard to FIGS. 7A-7E. In some implementations, the various operations described in connection with FIGS. 7A-7E may be performed automatically or at the request of the user.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. An optical system, comprising:
 a transmitter configured to:
  receive information associated with a modulation format and a baud rate for transmission of an optical signal that includes one or more subcarrier signals, and
  generate the optical signal based on the modulation format and the baud rate;
 a detector configured to:
  receive the information associated with the modulation format and the baud rate,
  receive the optical signal, and
  generate a dual-etalon response based on the optical signal, the modulation format, and the baud rate,
   the dual-etalon response including a plurality of peaks; and a controller configured to:
compare the one or more subcarrier signals of the optical signal and the plurality of peaks of the dual-etalon response,
determine, based on the comparing, whether at least one of the one or more subcarrier signals aligns with a peak of the plurality of peaks of the dual-etalon response, and
selectively lock a wavelength of the optical signal for the modulation format and the baud rate based on whether at least one of the one or more subcarrier signals aligns with a peak of the plurality of peaks of the dual-etalon response.

2. The optical system of claim 1, where the controller is further configured to:
selectively adjust the wavelength of the optical signal, to create an adjusted optical signal, based on whether at least one of the one or more subcarrier signals aligns with a peak of the plurality of peaks of the dual-etalon response.

3. The optical system of claim 2, where the controller is further configured to:
compare one or more subcarrier signals of the adjusted optical signal and the plurality of peaks of the dual-etalon response,
determine whether at least one of the one or more subcarrier signals of the adjusted optical signal aligns with a peak of the plurality of peaks of the dual-etalon response, and
lock a wavelength of the adjusted optical signal when at least one of the one or more subcarrier signals of the adjusted optical signal aligns with a peak of the plurality of peaks of the dual-etalon response.

4. The optical system of claim 2, where, when adjusting the wavelength of the optical signal, the controller is further configured to one of:
increase the wavelength of the optical signal, or
decrease the wavelength of the optical signal.

5. The optical system of claim 1, where, when generating the dual-etalon response, the detector is further configured to:
identify an etalon of the detector based on the modulation format and the baud rate,
receive the optical signal with the identified etalon, and
generate an interference pattern with the identified etalon and based on the optical signal,
the interference pattern corresponding to the dual-etalon response.

6. The optical system of claim 1, where the modulation format includes one of:
a quadrature phase-shift keying (QPSK) modulation format,
a 16-quadrature amplitude modulation (16-QAM) modulation format, or
an 8-QAM modulation format.

7. The optical system of claim 1, where the detector includes:
a first etalon that creates a first interference pattern based on the wavelength of the optical signal, and
a second etalon that creates a second interference pattern based on the wavelength of the optical signal,
the second interference pattern being different than the first interference pattern, and
the first etalon including a free spectral range that is different than a free spectral range of the second etalon.

8. An optical system, comprising:
an optical transmitter; and
a controller configured to:
receive a modulation format and a baud rate for transmission of an optical signal by the optical transmitter,
instruct the optical transmitter to generate the optical signal based on the modulation format and the baud rate,
the optical signal including one or more subcarrier signals,
instruct the optical system to generate a dual-etalon response based on the optical signal, the modulation format, and the baud rate,
the dual-etalon response including a plurality of peaks,
determine whether at least one of the one or more subcarrier signals aligns with a peak of the plurality of peaks of the dual-etalon response, and
instruct the optical transmitter to lock or adjust a wavelength of the optical signal for the modulation format and the baud rate based on whether at least one of the one or more subcarrier signals aligns with a peak of the plurality of peaks of the dual-etalon response.

9. The optical system of claim 8, where, when instructing the optical system to lock or adjust the wavelength, the controller is further configured to:
instruct the optical transmitter to lock the wavelength of the optical signal when at least one of the one or more subcarrier signals aligns with a peak of the plurality of peaks of the dual-etalon response.

10. The optical system of claim 8, where, when instructing the optical system to lock or adjust the wavelength, the controller is further configured to:
instruct the optical transmitter to adjust the wavelength of the optical signal, to create an adjusted optical signal, when none of the one or more subcarrier signals align with a peak of the plurality of peaks of the dual-etalon response.

11. The optical system of claim 10, where the controller is further configured to:
determine whether at least one subcarrier signal of the adjusted optical signal aligns with a peak of the plurality of peaks of the dual-etalon response, and
instruct the optical transmitter to lock a wavelength of the adjusted optical signal when at least one subcarrier signal of the adjusted optical signal aligns with a peak of the plurality of peaks of the dual-etalon response.

12. The optical system of claim 10, where, when instructing the optical system to adjust the wavelength of the optical signal, the controller is further configured to:
instruct the optical system to increase the wavelength of the optical signal.

13. The optical system of claim 8, where, when instructing the optical system to generate the dual-etalon response, the controller is further configured to:
identify an etalon of the optical system based on the modulation format and the baud rate, and
instruct the identified etalon to generate an interference pattern based on the optical signal,
the interference pattern corresponding to the dual-etalon response.

14. The optical system of claim 8, where the modulation format includes one of:
a quadrature phase-shift keying (QPSK) modulation format,
a 16-quadrature amplitude modulation (16-QAM) modulation format, or
an 8-QAM modulation format.

15. A method, comprising:
receiving, by a device, a modulation format and a baud rate for transmission of an optical signal by the device;
generating, by the device, the optical signal based on the modulation format and the baud rate,
the optical signal including one or more subcarrier signals;
generating, by the device, a dual-etalon response based on the optical signal, the modulation format, and the baud rate,
the dual-etalon response including a plurality of peaks;
comparing, by the device, the one or more subcarrier signals of the optical signal and the plurality of peaks of the dual-etalon response;
determining, by the device and based on the comparing, whether at least one of the one or more subcarrier signals aligns with a peak of the plurality of peaks of the dual-etalon response; and
locking or adjusting, by the device, a wavelength of the optical signal for the modulation format and the baud rate based on whether at least one of the one or more subcarrier signals aligns with a peak of the plurality of peaks of the dual-etalon response.

16. The method of claim 15, where locking or adjusting the wavelength comprises:
locking the wavelength of the optical signal when at least one of the one or more subcarrier signals aligns with a peak of the plurality of peaks of the dual-etalon response.

17. The method of claim 15, where locking or adjusting the wavelength comprises:
adjusting the wavelength of the optical signal, to create an adjusted optical signal, when none of the one or more subcarrier signals align with a peak of the plurality of peaks of the dual-etalon response.

18. The method of claim 17, further comprising:
comparing one or more subcarrier signals of the adjusted optical signal and the plurality of peaks of the dual-etalon response;
determining whether at least one of the one or more subcarrier signals of the adjusted optical signal aligns with a peak of the plurality of peaks of the dual-etalon response; and
locking a wavelength of the adjusted optical signal when at least one of the one or more subcarrier signals of the adjusted optical signal aligns with a peak of the plurality of peaks of the dual-etalon response.

19. The method of claim 17, where adjusting the wavelength of the optical signal, to create the adjusted optical signal, comprises:
decreasing the wavelength of the optical signal.

20. The method of claim 15, where generating the dual-etalon response comprises:
determining an etalon of the device based on the modulation format and the baud rate;
receiving the optical signal with the determined etalon; and
generating an interference pattern with the determined etalon and based on the optical signal,
the interference pattern corresponding to the dual-etalon response.

* * * * *